United States Patent [19]

Adams et al.

[11] Patent Number: 4,526,740

[45] Date of Patent: Jul. 2, 1985

[54] METHOD OF FORMING A RING OF VISCOUS MATERIAL AGAINST A SUBSTRATE

[75] Inventors: Victor J. Adams, Tempe; Frank Polka, Phoenix, both of Ariz.

[73] Assignee: Motorola, Inc., Schaumburg, Ill.

[21] Appl. No.: 542,939

[22] Filed: Oct. 18, 1983

Related U.S. Application Data

[62] Division of Ser. No. 378,026, May 13, 1982, Pat. No. 4,480,983.

[51] Int. Cl.$^3$ .............................................. B29F 3/04

[52] U.S. Cl. .......................... 264/259; 264/DIG. 67; 425/113; 425/380; 425/DIG. 47

[58] Field of Search .............. 264/DIG. 67, 153, 259, 264/268; 425/809, 113, DIG. 42, DIG. 47, 380

[56] References Cited

U.S. PATENT DOCUMENTS

| | | | |
|---|---|---|---|
| 945,357 | 1/1910 | Wilzin | 425/809 |
| 1,451,470 | 4/1923 | Peelle | 425/809 |
| 2,893,893 | 7/1959 | Crouse . | |
| 3,074,810 | 1/1963 | Timson | 425/809 |
| 3,343,211 | 9/1967 | Strickman | 425/809 |
| 4,005,960 | 2/1977 | Herdzina, Jr. | 425/809 |

*Primary Examiner*—James Lowe

*Attorney, Agent, or Firm*—Paul F. Wille

[57] ABSTRACT

A method for dispensing viscous materials is described in which a quill having a fluted insert comprise end portions having a small radius of curvature. The viscous material is extruded from the collet, brought into contact with the article on which the material is to be deposited, and then removed leaving a hollow figure of material having approximately the same shape as the cross-section of the quill.

1 Claim, 3 Drawing Figures

METHOD OF FORMING A RING OF VISCOUS MATERIAL AGAINST A SUBSTRATE

This is a division of application Ser. No. 378,026, filed May 13, 1982, now U.S. Pat. No. 4,480,983.

BACKGROUND

This invention relates to fluid dispenser and, in particular, to a dispenser for viscous materials wherein the material is left in a predetermined pattern on an article.

In the manufacture of various electronic devices, it is often desired to form a sealing coating between parts of such devices. One example of such a device is a piezoresistive pressure transducer wherein a silicon die is bonded to a substrate with an elastomeric material, eg. silicone rubber. The elastomeric material acts as an adhesive, a seal, and a stress isolator for the silicon die so that dimensional changes in the die are due to changes in ambient pressure and not dimensional changes in the substrate due to temperature changes.

A problem in the manufacture of such transducers is the need to have the silicone rubber only around the periphery of the die. The central area of the die must be unsupported. For relative pressure transducers, both sides of the chip must communicate to outside of the package. For these devices, the hole through the package must not be plugged by the silicone rubber.

Prior art techniques such as screen printing epoxy for die attach are not suited for small devices, eg. devices having an outside diameter (excluding leads) of 15 mm. Other techniques, such as using a small spatula to spread a thin layer of material or a needle to deposit and join together a series of beads to form the desired shape, are unsuited to mass production and, in particular, to automation.

In view of the foregoing, it is therefore an object of the present invention to provide an improved dispenser for viscous materials.

Another object of the present invention is to provide a dispenser particularly suited to dispensing viscous material in small places.

Another object of the present invention is to provide a dispenser for forming small, open shapes of viscous material on an article.

A further object of the present invention is to provide an improved method for dispensing viscous material.

Another object of the present invention is to provide an improved method for dispensing viscous material in small places.

A further object of the present invention is to provide an improved method for forming small, open shapes of viscous material on an article.

SUMMARY

The foregoing objects are achieved in the present invention wherein a collet comprising a quill and an insert are used for dispensing the viscous material, ie. a material having a viscosity greater than 100 Pascal-seconds (1000 poises). The quill comprises a cylindrical member having a tapered wall at one end thereof terminating in a small radius, eg. less than one tenth the diameter of the quill at that end. Disposed within the quill at the tapered end is a fluted insert. The fluted insert comprises a tapered bore facing in the same direction as the tapered end of the quill. Viscous material is extruded from the tapered end of the quill to form a bead which is brought into contact with the article onto which the material is to be deposited. The collet is withdrawn, leaving an open shape or ring of viscous material.

DETAILED DESCRIPTION

Figure 1:
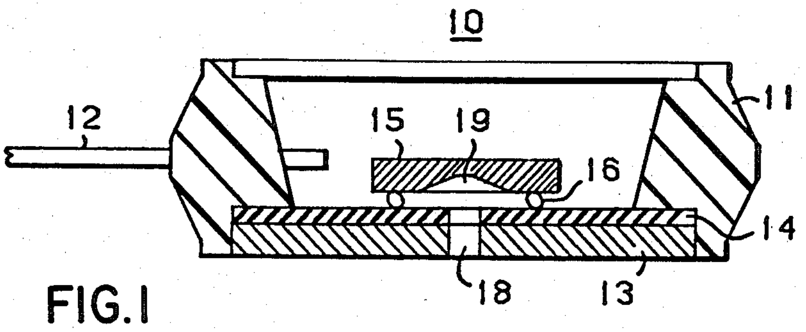
FIG. 1 illustrates a partially assembled pressure transducer having a ring of material deposited in accordance with the present invention.

FIG. 1 illustrates a particular example of a device whose manufacturer is enhanced by the use of the present invention. In particular, FIG. 1 illustrates a partially assembled pressure transducer 10 comprising a body 11 defining an annular ring of plastic material into which electrodes 12 are imbedded. Closing one side of the interior of body 11 is metal disc 13 having elastomeric layer 14 thereon. Positioned within body 11 is a semiconductor chip or die 15 which is separated from layer 14 by a closed ring of elastomeric material 16. Ring 16 performs several functions, namely supporting chip 15, sealing chamber 19 defined by die 15, and isolating die 15 from stress caused by changes in dimension of disc 13. If transducer 10 is to be a gauge of relative pressure, then disc 13 defines a bore 18 which is aligned with the chamber formed by semiconductor die 15 and ring 16. The relative pressures desired to be measured are coupled to either side of the die and the change in dimension of the die in response thereto is converted into an electrical signal. If transducer 10 is to be used as an absolute pressure gauge, then bore 18 is omitted and transducer 10 is assembled in a vacuum which is preserved by the seal formed by ring 16.

For gauge use, it is important that ring not extend under the central portion of die 15 and, in particular, that the material forming ring 16 not plug bore 18. As described above, prior art techniques for forming ring 16 are neither entirely accurate or amenable to automated production. This is particularly true for devices like transducer 10 which uses a small, open shape of material.

Figure 2:
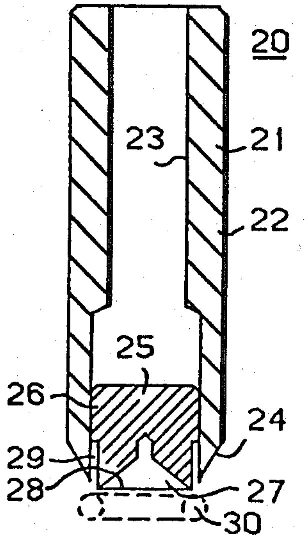
FIG. 2 illustrates a collet in accordance with a preferred embodiment of the present invention.

FIG. 2 illustrates a collet in accordance with the present invention through which a suitable elastomeric material, or any viscous material, can be extruded to form hollow shapes or rings. Collet 20 comprises a quill 21 in the form of a cylinder having an outside surface 22 and an inside surface 23. Quill 21 may have any desired shape in cross-section in a plane perpendicular to the drawing. For the particular example used herein, a pressure transducer, it is preferred that quill 21 have a rectangular or square shape to match the outline of the die to be sealed within the transducer.

Figure 3:
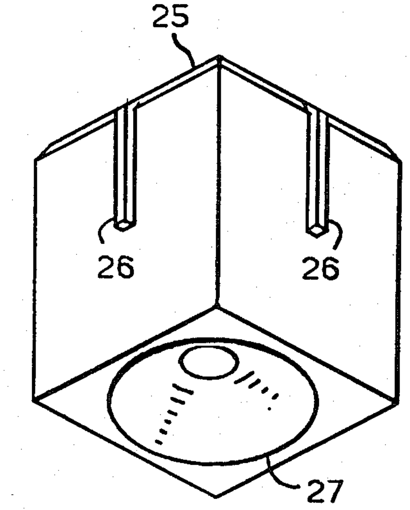
FIG. 3 illustrates in perspective the insert for the collet in accordance with the present invention.

Fitted within quill 21 is insert 25, also illustrated in FIG. 3, having flutes 26 at the upper portion thereof to space the body of insert 25 within quill 21. The number and positioning of the flutes is not critical, but the flutes should not be so numerous as to obstruct the flow of the viscous material. For the particular application herein described, it is preferred that insert 25 comprise a solid block of material due to the small size of the insert. A tapered bore 27, eg. a four-sided inverted pyramid bore, is formed in the lower portion of insert 25 and extends to the bottom thereof to form an edge 28 having a small radius of curvature, eg. less than one-fifth the diameter of insert 25. The wall thickness of quill 21 is reduced at the lower end thereof to form taper 24 which extends from the outer wall 22 to inner wall 23. As with insert 25, the radius of curvature of the end of quill 21 is preferably very small. It is preferred that taper 24 be formed in the outside surface of quill 21 so that gap 29 be as narrow as possible. The area of gap 29 in a plane perpendicular to quill 21 should be large enough to suspend a bead of viscous material, but not so large as to interfere with separating the bead from the quill.

In one embodiment of the present invention, for extruding rings of CRTV 6424 adhesive sealant (viscosity of 1000 P-s) as is available from General Electric Company, insert 25 was 2.5 mm per side, gap 29 was 0.25 mm, and flutes 26 were dimensioned for a press fit. Insert 25 extended from the end of quill 21 approximately 0.1 mm. The outside ends of quill 21 and insert 25 each had a radius of approximately 0.1 mm and were polished; Quill 21 and insert 25 were made of steel. Although a specific material and dimensions are given, such is by way of example only.

In use, material is caused to flow from the top of collet 20 out through the bottom by way of gap 29 formed between the outside of insert 25 and the inside wall of quill 23. The dimension of gap 29 depends on the diameter of collet 20 and the viscosity of the material, but is appropriate dimension such that the viscous material forms bead 30 outside collet 20. The bead is then brought into contact with the article to be coated. Collet 20 is brought within a predetermined distance of the article so as to apply a slight pressure to the bead such that the contact area on the article exceeds the contact area with the end of the collet. Since the radii of curvature of the ends of quill 21 and insert 25 are quite small, the contact area with the material is also quite small. Thus the material is readily detached by withdrawing collet 20 after contact between the bead and the article to be coated.

Alternatively, a partial bead is extruded while collet 20 is positioned with respect to the article to be coated. Once in position, additional material is extruded to contact the article, which is separated from collet 20 by slightly less than the diameter of the bead. The collet is then withdrawn, leaving a pattern of material in the desired hollow figure.

There is thus produced a uniform ring of material which is easily and rapidly formed in a single operation by extrusion of the material from collet 20. Collet 20 thus enables one to automate the coating operation in the manufacture of devices.

Having thus described the invention it will be apparent to those of skill in the art that various modifications can be made within the spirit and scope of the present invention. For example, while illustrated as producing a closed ring, insert 25 may comprise a solid flute along one side to produce an open or U-shaped ring of viscous material. Similarly, as previously noted, the cross-sectional shape of collet 20 is determined by the particular use. Further, while illustrated in cross-section as comprising metal, quill 21 and insert 25 may comprise any suitable material and need not be the same material. For example, depending upon the viscous material to be deposited, quill 21 and insert 25 may comprise suitable plastics to which the viscous material tends not to adhere.

We claim:

1. A method for forming a ring of viscous material on an article comprising the steps of:

extruding the viscous material from a collet having a cylindrical member and an insert, each with a relatively small surface area in cross-section at the end thereof;

terminating said extrusion when a bead forms in the extruded material;

contacting said material to said article, slightly compressing said material by extruding more viscous material from said collet; and withdrawing said collet to separate the material from said collet.

* * * * *